(12) United States Patent
Moeller

(10) Patent No.: US 9,410,643 B2
(45) Date of Patent: Aug. 9, 2016

(54) CABLE HANG-OFF ARRANGEMENT

(71) Applicant: Siemens Aktiengesellschaft, München (DE)

(72) Inventor: Jesper Moeller, Esbjerg (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 13/953,841

(22) Filed: Jul. 30, 2013

(65) Prior Publication Data

US 2014/0037384 A1    Feb. 6, 2014

(30) Foreign Application Priority Data

Aug. 6, 2012 (EP) .................................... 12179409

(51) Int. Cl.
| | |
|---|---|
| *F16L 7/00* | (2006.01) |
| *E02B 17/00* | (2006.01) |
| *F16L 1/15* | (2006.01) |
| *F16L 1/235* | (2006.01) |
| *H02G 9/02* | (2006.01) |
| *H02G 1/10* | (2006.01) |

(52) U.S. Cl.
CPC . *F16L 7/00* (2013.01); *E02B 17/00* (2013.01); *F16L 1/15* (2013.01); *F16L 1/235* (2013.01); *H02G 1/10* (2013.01); *H02G 9/02* (2013.01)

(58) Field of Classification Search
CPC ................. F16L 1/12; F16L 1/15; F16L 3/00; F16L 3/02; F16L 3/08; F16L 3/12; F16L 7/00

USPC ..................... 405/158, 224.2–224.4
See application file for complete search history.

(56) References Cited

U.S. PATENT DOCUMENTS

| | | | | |
|---|---|---|---|---|
| 4,024,718 | A * | 5/1977 | Roche et al. ................... | 405/190 |
| 4,272,059 | A * | 6/1981 | Noerager et al. ............. | 254/392 |
| 6,173,782 | B1 * | 1/2001 | Watkins ........................ | 166/367 |
| 6,213,686 | B1 * | 4/2001 | Baugh ........................... | 405/166 |
| 7,563,055 | B2 * | 7/2009 | Roodenburg et al. .......... | 405/169 |
| 7,982,330 | B1 | 7/2011 | Ueno et al. | |
| 2003/0026662 | A1 | 2/2003 | Vidal et al. | |

(Continued)

FOREIGN PATENT DOCUMENTS

| | | |
|---|---|---|
| CN | 102269328 A | 12/2011 |
| EP | 2158654 B1 | 10/2011 |

(Continued)

*Primary Examiner* — Tara M. Pinnock

(57) ABSTRACT

A cable hang-off arrangement for an elevated support including a cable assembly with a flexible reinforced protective tube for accommodating a transmission cable arrangement, a mounting assembly arranged on the elevated support, and a lifting assembly for lifting the cable assembly from a lower level to the elevated support, which lifting assembly is realized to engage with the mounting assembly such that the cable assembly is suspended between the elevated support and the lower level. An offshore facility mounted on an elevated support above a variable lower level including a transmission cable arrangement and a flexible protective tube for guiding the transmission cable arrangement through an essentially vertical direction from the elevated support to the lower level into an essentially horizontal direction at the lower level is also provided. A method of mounting such a cable hang-off arrangement is also provided.

20 Claims, 6 Drawing Sheets

(56) References Cited

U.S. PATENT DOCUMENTS

2010/0104370 A1    4/2010    Van Egmond
2011/0158748 A1    6/2011    Brocklebank et al.

FOREIGN PATENT DOCUMENTS

GB            2337366 A    11/1999
WO    WO 2006132544 A1    12/2006

* cited by examiner

CABLE HANG-OFF ARRANGEMENT

CROSS REFERENCE TO RELATED APPLICATIONS

The present application claims priority to European Patent Office application No. 12179409.3 EP filed Aug. 6, 2012, the entire content of which is hereby incorporated herein by reference.

FIELD OF INVENTION

The invention describes a cable hang-off arrangement; an offshore facility; and a method of mounting a cable hang-off arrangement.

BACKGROUND OF INVENTION

An offshore facility such as a wind turbine mounted on an offshore support structure requires a transmission link to other offshore facilities, such as other wind turbines, a sub-station, etc. Usually, a transmission cable arrangement between two such facilities rests on the seabed. To this end, the transmission cable arrangement is suspended from a platform or intermediate level, usually referred to as a "transition piece", at the base of the wind turbine tower to the seabed. Such a transmission cable arrangement can comprise a number of power transmission cables arranged in a tube or hose. To protect the transmission cable from excessive bending, a rigid curved steel tube (usually referred to as a "J-tube" on account of its shape) is usually arranged between the transition piece and the base of the offshore support structure to ensure that the bending radius of the transmission cable is acceptable. At the lower end of the J-tube, the transmission cable emerges and lies on the seabed. However, a problem arises when the seabed is scoured away at the base of the offshore structure, for example as a result of tidal forces. It may happen that the seabed is scoured away from underneath the end of the J-tube to such an extent that the J-tube exit is now higher than the seabed, so that the transmission cable is forced to bend sharply downward at the J-tube exit. The transmission cable may become damaged as a result, and costly repairs may ensue. For this reason, the lower portion of such a rigid J-tube is usually flushed into the seabed, so that it is buried under sand. However, it is difficult to predict the correct length for such a J-tube and to predict the extent of scouring that may arise over time, so that flushing the J-tube end section into the seabed is not a reliable solution.

Another disadvantage of the known approaches is that divers are required to assist the loading of the transmission cable into the J-tube, so that the initial construction costs are relatively high. The J-tube must be securely connected to the support structure, usually by welding. However, weld points can also be prone to failure over time and may require costly repairs. Furthermore, a transmission cable must be pulled into a rigid J-tube already in place between the support structure and the seabed. Damage to the transmission cable can result as it is pulled up through the curved end section of the rigid steel J-tube. For example, an otherwise circular cross-sectional shape of a transmission cable can become flattened by distortion when undue force is exerted during the loading or pulling procedure.

SUMMARY OF INVENTION

It is therefore an object of the invention to provide an improved yet economical way of suspending a transmission cable from an offshore facility that avoids the problems mentioned above.

This object is achieved by the cable hang-off arrangement of the claims; by the offshore facility of the claims; and by the method of the claims of mounting a cable hang-off arrangement.

According to the invention, the cable hang-off arrangement for an elevated support comprises a cable assembly with a flexible reinforced protective tube for accommodating a transmission cable arrangement; a mounting assembly arranged on the elevated support; and a lifting assembly for lifting the cable assembly from a lower level to the elevated support, which lifting assembly is realised to engage with the mounting assembly such that the cable assembly is essentially vertically suspended between the elevated support and the lower level.

An advantage of the cable hang-off arrangement according to the invention is that the transmission cable can very easily and economically be brought into place at the elevated support. For example, the lifting assembly and the flexible reinforced protective tube can be raised or lifted as one element to the elevated support. Unlike the prior art approaches, it is not necessary to first mount the flexible reinforced protective tube to the elevated support and then to load the transmission cable; instead, for example, a cable assembly comprising the transmission cable and flexible reinforced protective tube can previously be assembled and can be lifted into place in one procedure. The cable hang-off arrangement according to the invention does not require any divers to load the transmission cable into the protective tube, so that the cost of construction of a facility on the elevated support, for example a wind turbine, can be favourably reduced. Also, by realising the lifting assembly and the mounting assembly to engage with each other, a very straightforward mounting procedure is made possible, saving time and therefore also expense.

According to the invention, the offshore facility, mounted on an elevated support above a variable lower level, comprises a transmission cable arrangement and a flexible protective tube for guiding the transmission cable arrangement through an essentially vertical direction from the elevated support to the lower level into an essentially horizontal direction at the lower level, wherein a cable assembly comprising the transmission cable arrangement and the flexible protective tube is suspended from the elevated support by a cable hang-off arrangement, preferably a cable hang-off arrangement according to the invention.

An advantage of the offshore facility according to the invention is that the transmission cable, required for connecting to another offshore facility, can be easily laid with relatively little effort and low costs. Furthermore, the likelihood of damage to the transmission cable at the lower exit opening of the flexible protective tube is greatly reduced, since the flexible protective tube can adapt to any alterations in height of the lower level. For example, if the lower level is the seabed and scouring results in a removal of sand or sediment at the base of a supporting structure of the offshore facility, a lower portion of the flexible protective tube simply adapts to the new level. Similarly, a build-up of sand or sediment simply causes the flexible protective tube to automatically adjust its position. In this way, the transmission cable is protected from a potentially damaging bending at the exit opening of the flexible protective tube.

According to the invention, the method of mounting such a cable hang-off arrangement to an elevated support, preferably a marine support, comprises the steps of arranging a mounting assembly of the cable hang-off arrangement on the elevated support such that the mounting assembly can at least partially enclose a cable assembly; attaching a cable assembly to a lifting assembly of the cable hang-off arrangement;

raising the lifting assembly to the elevated support; and securing the lifting assembly to the mounting assembly such that the cable assembly is suspended between the elevated support and a variable lower level.

An advantage of the method according to the invention of mounting the cable hang-off arrangement is that the cable assembly can easily be secured to the elevated support. Since the cable assembly can comprise a transmission cable arrangement in a flexible protective tube, these elements can be brought into place as one unit, and a time-consuming and potentially hazardous loading step is not required. For a marine support, for example of a wind turbine, divers are not needed for any steps of the method.

Particularly advantageous embodiments and features of the invention are given by the dependent claims, as revealed in the following description. Features of different claim categories may be combined as appropriate to give further embodiments not described herein.

In the following, without restricting the invention in any way, it may be assumed that an offshore facility is a wind turbine. A wind turbine generally comprises a nacelle mounted on top of a tower. An offshore wind turbine is generally supported on the seabed by some suitable supporting structure such as a jacket structure, a monopile, a floating platform, etc. Furthermore, again without restricting the invention in any way, it may be assumed in the following that the elevated support is a transition platform or transition piece between the wind turbine tower and the supporting structure. A transition piece generally comprises an opening through which a transmission cable arrangement can pass, so that a wind turbine can be electrically connected to other wind turbines of a wind park, to a substation, etc.

A "transmission cable arrangement" will be understood in the following to comprise any number of cables required for connecting a wind turbine to another facility. For example, the transmission cable arrangement can comprise power cables for transmitting the generated power to a substation, as well as data cables for connecting a controller of the wind turbine to a park pilot. Generally, a transmission cable arrangement will comprise a bundle of cables enclosed within a protective jacket. The material of the protective jacket can be chosen to suit conditions underwater. For example, the protective jacket should be strong, should not corrode, and should be flexible. A certain degree of buoyancy would also be beneficial. In the following, therefore, but without restricting the invention in any way, it may be assumed that the protective jacket comprises a flexible hollow tube made of a suitable material such as polyethylene (PE) or cross-linked polyethylene (PEX, XLPE) for enclosing the transmission cables.

According to the invention, the cable assembly comprises a reinforced protective tube (armoured rubber or plastic hose, flexible J-tube) for accommodating the transmission cable arrangement. The reinforced protective tube can be realised in any suitable manner, and should protect the transmission cable arrangement from damage without actually exerting any pressure on the transmission cable arrangement. Furthermore, the degree of flexibility of the reinforced protective tube is preferably such that a minimum bending radius is not exceeded. This is because a transmission cable may not be bent beyond a certain percentage of the outer diameter of the cable, if damage to the transmission cable is to be avoided. The reinforced protective tube could comprise an open mesh tube made of interlocking links of a robust material such as steel, in which the transmission cable assembly can be arranged. The "armour" is given by the steel mesh, and the interlocking links allows the tube to adjust its curvature at the level of the seabed. However, particularly at the level of the seabed, debris or underwater vegetation may become tangled in the open mesh and may restrict the flexibility of the tube. Therefore, in a particularly preferred embodiment of the invention, the reinforced protective tube comprises a closed armoured hose. Preferably, the hose is made of rubber, plastic or some other suitably flexible material. The armour can be arranged about an outer and/or inner surface of the reinforced protective tube, for example as an open steel mesh. However, over time, such a steel mesh may corrode or rust. Therefore, in a particularly preferred embodiment of the invention, the flexible reinforced protective tube comprises an internally armoured hose, wherein the armour is embedded within the material of the hose. Preferably, the armour is made of seawater resistant stainless steel. Such an armoured hose can easily adapt a curvature of its lower end section to any variations in the level of the seabed. In the following, without restricting the invention in any way, the reinforced protective tube may simply be referred to as a "rubber J-tube" or "flexible hose" or other combination of such terms, and it will be understood that any suitable material such as a flexible plastic or other flexible material could equally well be used in addition to or as an alternative to rubber. The diameter of the rubber J-tube is preferably somewhat larger than the diameter of the transmission cable arrangement that it protects.

To adapt to any changes in the level of the seabed, in a particularly preferred embodiment of the invention, the length of the rubber J-tube is chosen such that a lower portion always assumes a curved shape when it rests on the seabed. The overall length of the rubber J-tube therefore comprises the height of the supporting structure plus a generous allowance. Knowledge of the nature of the seabed and of the local tidal behaviour, as well as experience gathered from observing scouring effects in prior art offshore facilities, can be applied in choosing the additional allowance. The allowance can comprise several meters. For example, if the supporting structure is 40 m in height, a rubber J-tube of 60 m can be chosen, so that the additional 20 m in length provide sufficient assurance that the lower portion of the rubber J-tube always rests on the seabed or is able to withstand being unsupported in the water.

The lifting assembly of the cable hang-off according to the invention is used to lift the cable assembly into place at the transition piece. During the lifting manoeuvre, the cable assembly is preferably attached in some way to the lifting assembly. However, such an attachment should not require any manipulation of a protective jacket of the transmission cable arrangement. Therefore, in a preferred embodiment of the invention, the lifting assembly comprises a suspension means for suspending the cable assembly from the lifting assembly. For example, the suspension means can comprise a means of attaching the transmission cable arrangement to the lifting assembly. In a preferred embodiment of the invention, the suspension means comprises one or more wire mesh stockings, depending on the size and weight of the cable, arranged to enclose a length of the transmission cable arrangement, and the attachment means is realised for connection to the mesh stocking. For example, the attachment means can comprise a number of pins or hooks about the lifting assembly, so that loops of a mesh stocking can be looped over suspension bolts, pins or hooks. The stockings will carry the weight of the transmission cable arrangement and will prevent it from sliding down into the tube. Preferably, a mesh stocking is made of seawater resistant stainless steel. The stockings can be further secured to the cable by means of steel hose clamps. The weight of the transmission cable arrangement can be favourably reduced due to the buoyancy of the material of the protective jacket of the transmission cable arrangement, for example XLPE.

The rubber J-tube is preferably also securely attached to the lifting means, so that a safe lifting procedure can be ensured, and so that the rubber J-tube is later firmly secured at the level of the transition piece. Therefore, in a further preferred embodiment of the invention, the suspension means comprises a clamping means for clamping an exposed portion of a reinforcing layer to the lifting assembly. For example, the lifting assembly can comprise two plates arranged to be clamped about an exposed portion of the armouring of an armoured rubber hose. The two plates can have the same shape and can be connected together to "sandwich" the exposed portion of the armouring between them. When in place on the transition piece, the lifting assembly ensures that the rubber J-tube is suspended freely from the hang-off arrangement. The rubber J-tube can be manufactured to leave a portion of the armouring exposed, or an off-the-shelf armoured hose can be adapted by removing a suitably long portion of the rubber from the end of the hose that is to be suspended from the lifting assembly.

To raise the lifting assembly from the seabed, it is preferably connected in some way to a hoisting apparatus such as a crane or winch. Therefore, in a further preferred embodiment of the invention, the lifting assembly of the cable hang-off comprises a lifting connector for connection to a lifting apparatus. The lifting connector can be, for example, a pin extending from a "top" surface of the lifting assembly, with a through-hole for accommodating a wire or chain suspended from a crane. In a particularly preferred embodiment of the invention, the lifting connector and the attachment means for a mesh stocking are realised as one, i.e. a pin or protrusion about which the stocking can be suspended can also comprise a through-hole for a hoisting wire or cable.

When the lifting assembly is raised to the level of the transition piece, it can be secured to the mounting assembly. In one embodiment, the mounting assembly can simply comprise a number of pins or protrusions fastened to the transition piece such that the lifting assembly can connect with these and be secured in place. However, such an embodiment might involve time-consuming construction work on the transition piece. Preferably, therefore, the mounting assembly is constructed prior to delivery to the offshore location, so that it can simply be arranged in place above the opening in the transition piece. In a particularly preferred embodiment of the invention, therefore, the lifting assembly and the mounting assembly comprise complementary essentially semi-circular forms, preferably with an overlapping portion. The overlapping portions can be used to form a secure connection between the lifting and mounting assemblies. For example, the lifting assembly could be welded to the mounting assembly. However, in a further preferred embodiment of the invention, the mounting assembly and the lifting assembly comprise at least one pair of complementary through-openings for accommodating a fastener to secure the lifting assembly to the mounting assembly.

Once the lifting assembly has been raised to the level of the transition piece, it can be secured in place by connecting it to the mounting assembly, for example by passing fasteners through pairs of matching bushings or through-holes in the lifting and mounting assemblies. However, the weight of the lifting and cable assemblies and their large size might make this procedure relatively difficult. To solve this problem, the mounting and the lifting assemblies can be shaped to fit together in a particular manner. For example, the mounting assembly may be shaped to have a lower section and a higher section and a "step" between these sections, while the lifting assembly is shaped in a complementary manner. However, to keep the manufacture of the mounting and lifting assemblies as simple as possible, in a preferred embodiment of the invention, the mounting assembly comprises a number of guiding pins arranged to guide the lifting assembly onto the mounting assembly. A guiding pin can extend vertically upward from the mounting assembly, and the lifting assembly can comprise a through-opening arranged to coincide with the guiding pin when the lifting assembly is correctly positioned relative to the mounting assembly. In this way, the lifting assembly can simply be lowered onto the mounting assembly, and the guiding pin serves the additional purpose of ensuring that the lifting assembly is then held in place.

At the level of the transition piece, the transmission cable assembly exits the top of the rubber J-tube and enters the tower of the wind turbine. Preferably, the transmission cable assembly should be restricted from moving relative to the transition piece. Using the cable hang-off according to the invention, the secure positioning of the cable assembly is ensured, since the cable assembly is suspended from the lifting assembly, which in turn is connected to the mounting assembly at the transition piece.

There are several ways in which a transmission cable can be connected between offshore facilities, for example between wind turbines of a wind park. In one approach, a transmission cable for a wind turbine can be deposited in advance on the seabed near the support structure for that wind turbine. When the wind turbine is completed, the terminating end of the transmission cable can then be raised from the seabed and lifted to the transition piece for connection to the wind turbine. In one embodiment of the method according to the invention, a lifting assembly already attached to a rubber J-tube and enclosing a transmission cable arrangement is laid on the seabed. If the cable assembly is to connect two wind turbines, such a lifting assembly and cable assembly can be provided on the seabed for each wind turbine. To be able to retrieve the lifting assembly from the seabed without having to engage divers, the method according to the invention preferably comprises the step of connecting a temporary messenger wire or catch wire to the lifting assembly before depositing the lifting assembly on the seabed and prior to the step of raising the lifting assembly to the elevated support. The messenger wire can be connected to a buoy anchored in the neighbourhood of the support structure. The messenger wire can later be connected to a winch so that the entire lifting assembly and cable arrangement can be raised in a straightforward manner to the level of the transition piece, where the lifting assembly can be connected to the mounting assembly. Preferably, such a winch can be installed on a transport vessel. Only a simple pulley or roller need be mounted on the transition piece to allow the messenger wire to smoothly pass over the level of the transition piece to the transport vessel.

Alternatively, in another embodiment, the lifting assembly and rubber J-tube can be raised in place and mounted on the supporting structure prior to loading with a transmission cable arrangement. Again, a messenger wire can have been arranged in the rubber J-tube and both ends of the messenger wire can be connected to a buoy. A transport vessel with a transmission cable arrangement can approach the buoy, and retrieve the messenger wire ends. One end can be connected to a terminating end of the transmission cable arrangement, and the other end can be connected to a pulling mechanism such as a winch. A pushing mechanism can then push the transmission cable arrangement into the lower portion of the rubber J-tube and upwards towards the transition piece, while the winch simultaneously pulls the messenger wire. In this way, a transmission cable arrangement can be relatively easily loaded into the rubber J-tube.

In a preferred embodiment of the invention, the step of arranging a transmission cable arrangement in a rubber J-tube is carried out prior to the step of attaching the cable assembly to the lifting assembly. Preferably, this step can be carried out prior to transport of the lifting assembly and cable assembly to the offshore location. For example, the transmission cable arrangement can be loaded into a rubber or plastic J-tube on land, and secured to a lifting assembly. A simple wire can be used to pull the transmission cable arrangement into the rubber J-tube. Such a "messenger wire" is first arranged in the rubber J-tube. To facilitate this procedure, a series of smooth balls (e.g. large plastic "beads") with diameters approaching the inner diameter of the rubber J-tube, can be strung on the wire. These allow a quick and uncomplicated loading of the messenger wire in the rubber J-tube. Subsequently, to load the transmission cable arrangement in the J-tube, one or more mesh stockings is arranged around one end of the transmission cable and connected to the end of the messenger wire that protrudes from the "seabed" end of the rubber J-tube, for example by means of a swivel. By pulling the messenger wire, the transmission cable is drawn into the rubber J-tube in a simple and quick loading procedure.

Since the transmission cable arrangement can comprise a tube with several cables, and these should be protected from water, in a preferred embodiment of the invention, the step of arranging the transmission cable arrangement in the rubber J-tube is preferably augmented by a step of terminating that end of the transmission cable arrangement. For example, a water-tight "hood" can be applied to the end of the transmission cable arrangement. This can be realised for later removal, once the transmission cable arrangement is in place and secured to the transition piece.

The step of drawing the transmission cable arrangement into the rubber J-tube is preferably carried out prior to a step of reeling the transmission cable onto a drum for transport to the offshore location. The same applies to the step of terminating an end of the transmission cable arrangement. A transport vessel can then feed out the transmission cable so that it is laid on the seabed, such that the lifting assembly and rubber J-tube are ultimately deposited near the supporting structure of the wind turbine.

Once the cable hang-off is mounted in place, the transmission cables can be connected to appropriate elements of the wind turbine, for example to switch gear of the generator, to a main controller, etc. The final position of the transmission cable assembly on the seabed can be mapped for future reference.

BRIEF DESCRIPTION OF THE DRAWINGS

Other objects and features of the present invention will become apparent from the following detailed descriptions considered in conjunction with the accompanying drawings. It is to be understood, however, that the drawings are designed solely for the purposes of illustration and not as a definition of the limits of the invention.

In the diagrams, like numbers refer to like objects throughout. Objects in the diagrams are not necessarily drawn to scale.

DETAILED DESCRIPTION OF INVENTION

Figure 1:
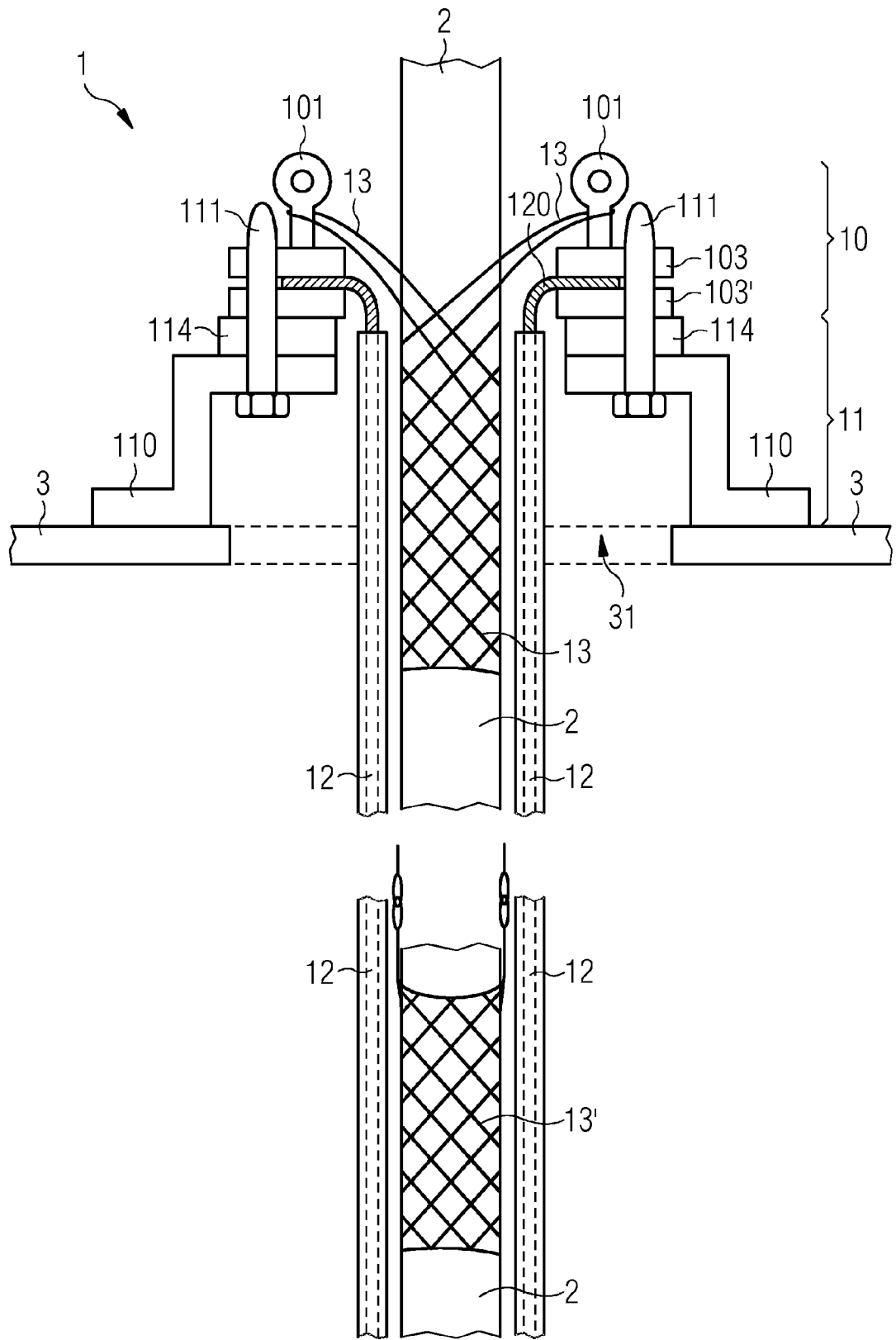
FIG. 1 shows a cable hang-off arrangement according to an embodiment of the invention.

FIG. 1 shows a schematic representation of a cable hang-off arrangement 1 according to an embodiment of the invention, in place on an elevated support 3, for example a transition piece 3 of an offshore wind turbine, after a lifting procedure has been carried out. The cable hang-off arrangement 1 comprises a lifting assembly 10, a mounting assembly 11, and an armoured rubber tube 12.

In this embodiment, the mounting assembly 11 comprises a mounting plate 114 mounted to brackets 110 on either side of an opening 31 in the elevated support 3. The lifting assembly 10 is positioned relative to the mounting assembly 11 by means of guide pins 111 of the mounting assembly 11.

The lifting assembly 10 comprises two clamping plates 103, 103' that clamp an exposed portion of an armour layer 120 of the armoured rubber tube 12. The clamping plates 103, 103' are shaped to fit onto the mounting plate 114 of the mounting assembly 11. In this way, the armoured rubber tube 12 can be suspended from the transition piece 3. The lifting assembly 10 comprises lifting lugs 101 that protrude upward and are used to attach the lifting assembly (with armoured rubber J-tube) into place, as will be described later. Strands of a first mesh or cable stocking 13, arranged about a transmission cable arrangement 2, are secured onto the flange arrangement 101. The weight of the transmission cable arrangement 2 acts to stretch the mesh stocking 13, thus tightening it and preventing a further downward movement of the transmission cable arrangement 2. Such mesh stockings are generally used as a temporary lifting aid, but are put to use by the cable hang-off 1 according to the invention as a permanent means of suspending the transmission cable arrangement 2 from the transition piece 3. The mesh stocking 13 can extend some length along the transmission cable arrangement 2. A second cable stocking 13' holds the transmission cable arrangement 2 below the first mesh stocking 13 to avoid damage, overexpansion or tearing of the transmission cable arrangement 2 from its own weight. In such an embodiment, the second mesh stocking 13' can also be suspended from the flange arrangement 101.

Lifting pins or lugs 101 also have through-holes for connecting to a lifting apparatus such as a crane or winch. The cable hang-off 1 can easily be secured to the transition piece 3 in a load-efficient manner, since the loads exerted by the transmission cable arrangement 2 and the rubber J-tube 12 are effectively transferred through the elements of the cable hang-off 1 and into the support structure 3. The inherent buoyancy of the rubber J-tube 12 makes this lighter compared to a conventional rigid steel J-tube, so that less weight need be carried by the support structure 3.

Figure 2:
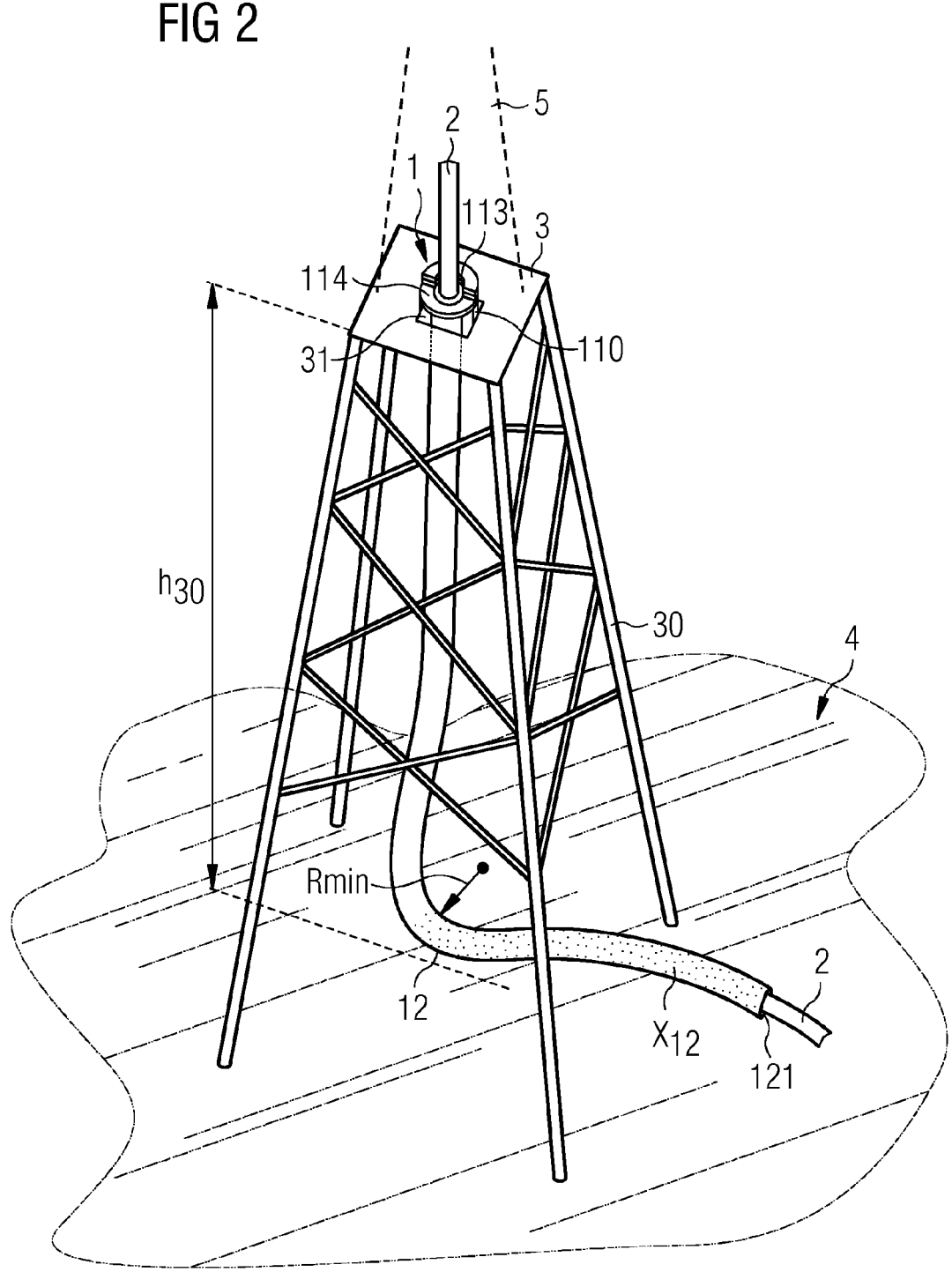
FIG. 2 shows a perspective view of an offshore support structure and a reinforced flexible protective tube suspended from the cable hang-off arrangement of FIG. 1.

FIG. 2 shows a perspective view of an offshore support structure 30 and a reinforced flexible protective tube 12 suspended from the cable hang-off arrangement 1 of FIG. 1 mounted to a transition piece 3. The diagram shows the cable hang-off arrangement 1 shortly after being mounted in place. The armoured rubber J-tube 12 still rests on the seabed 4 such that its end portion $x_{12}$, indicated by stippling, assumes a gently curved shape, thus ensuring that a minimum bending radius $R_{min}$ of any enclosed transmission cable arrangement 2 is maintained. The length of the armoured rubber J-tube 12 was chosen to be considerably longer than the height $h_{30}$ of the supporting structure 30. For example, the overall length of the rubber J-tube 12 can exceed the height $h_{30}$ of the supporting structure 30 by 30%-50%.

Figure 3:
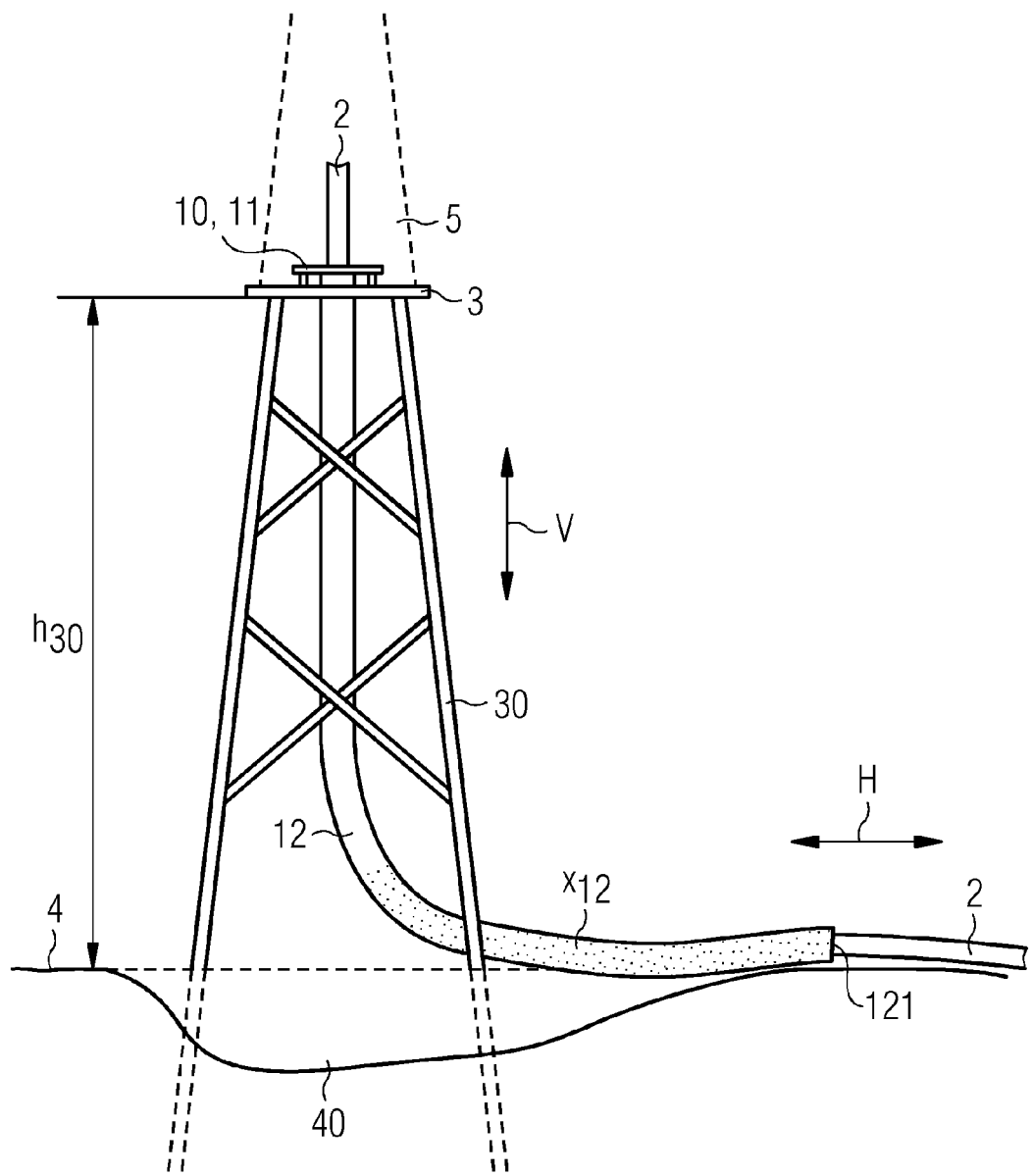
FIG. 3 shows a side view of the offshore support structure and the cable hang-off arrangement of FIG. 1.

FIG. 3 shows a side view of the offshore support structure 30 and the cable hang-off arrangement 1 of FIG. 1, at a later point in time. The diagram shows how the flexible protective rubber J-tube 12 guides the transmission cable arrangement 2 through an essentially vertical direction V from the elevated support 3 to the seabed 4 into an essentially horizontal direction H at the seabed 4. Scouring has resulted in significant portions of the seabed 4 being removed to leave a trough 40 at the base of the support structure 30. The end portion $x_{12}$ of the rubber J-tube 12, indicated by stippling, has simply adapted to the new contour of the seabed 4, and the still maintains a smoothly curved shape so that the transmission cables are effectively prevented from undue bending at the lower exit opening 121 of the rubber J-tube. This is because the length of the rubber J-tube was chosen to be considerably longer than the height $h_{30}$ of the supporting structure 30. Regardless of the extent of the scouring, the flexibility of the rubber J-tube always ensure that at least a minimum bending radius $R_{min}$ is maintained.

Figure 4:
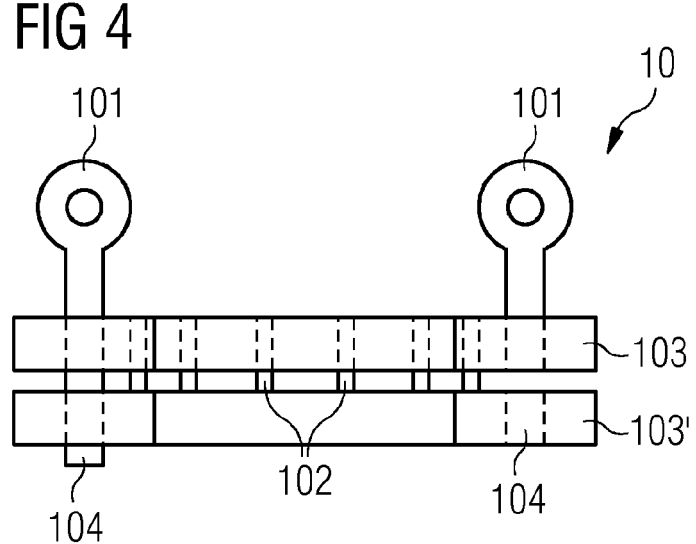
FIG. 4 shows a cross-section through a lifting assembly of an embodiment of the cable hang-off arrangement according to the invention.
Figure 5:
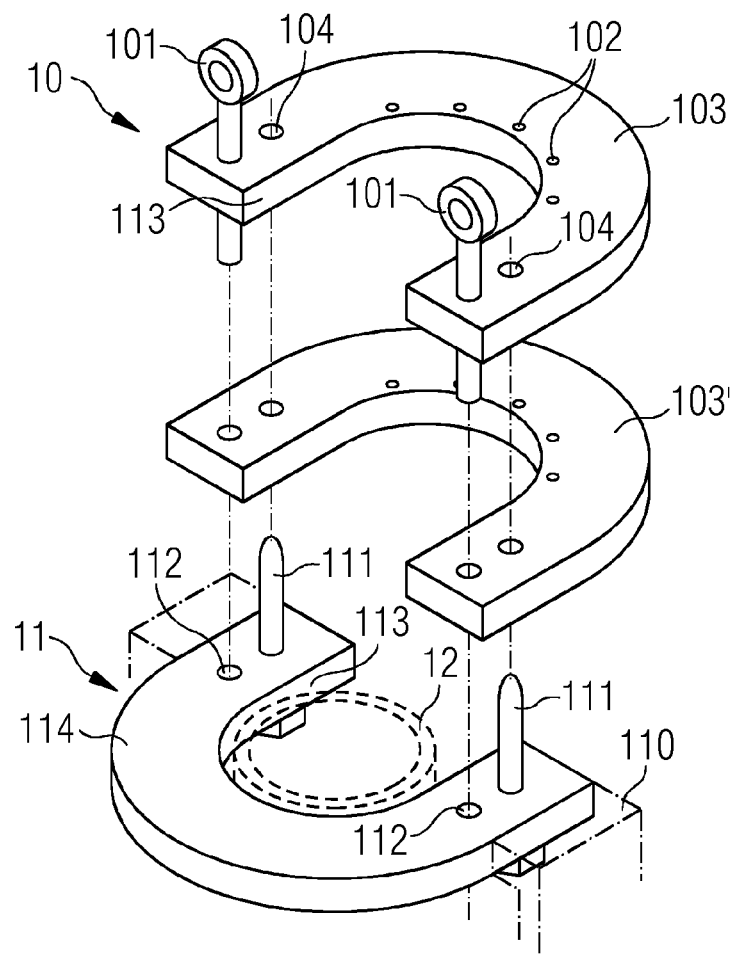
FIG. 5 shows an exploded of the lifting assembly of FIG. 4.

FIG. 4 shows a cross-section through a lifting assembly 10 of an embodiment of the cable hang-off arrangement according to the invention, and FIG. 5 shows a perspective exploded view. The lifting assembly 10 comprises two matching U-shaped plates 103, 103' that can be clamped about an exposed portion of the armouring of a rubber J-tube. Pins 102, rivets 102 or bolts 102 can be used to secure the armouring between the clamping plates 103, 103'. An upper plate 103 has two or more lifting pins or lugs 101 with through-holes for connecting to a messenger wire or other cable, so that the lifting assembly 10 can be raised from the seabed to the transition piece. Both plates 103, 103' comprise a number of through-holes 104 to match through-holes of the mounting assembly 11, to allow these to be securely fastened together.

FIG. 5 shows an exploded view of the lifting assembly 10 of FIG. 4, showing the U-shape of the plates 103, 103' in this embodiment. The U-shape is large enough to accommodate a rubber J-tube 12, indicated by the dashed line. Of course, any other shape is conceivable, for example a "square" U-shape, a V-shape, etc., as long as the reinforced hose can be accommodated in a sufficiently large space 113.

Figure 6:
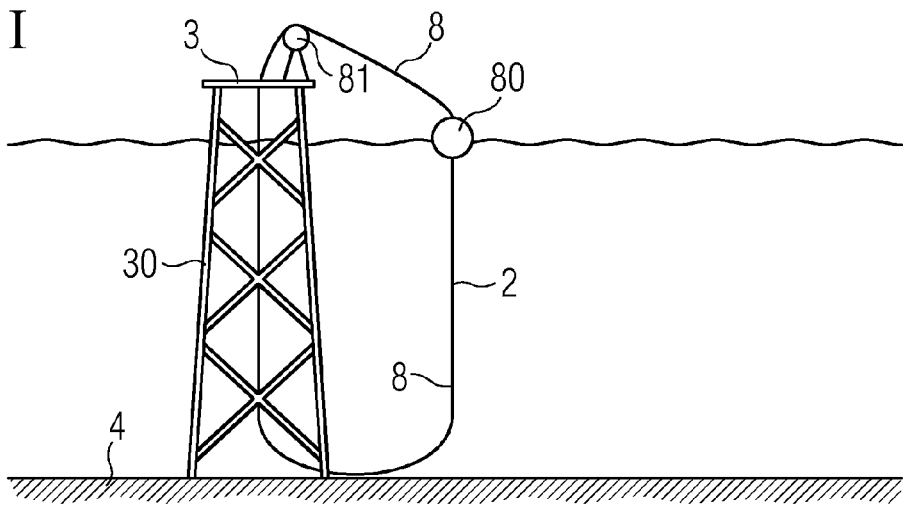
FIG. 6 shows several stages in a mounting procedure according to the invention.
Figure 6:
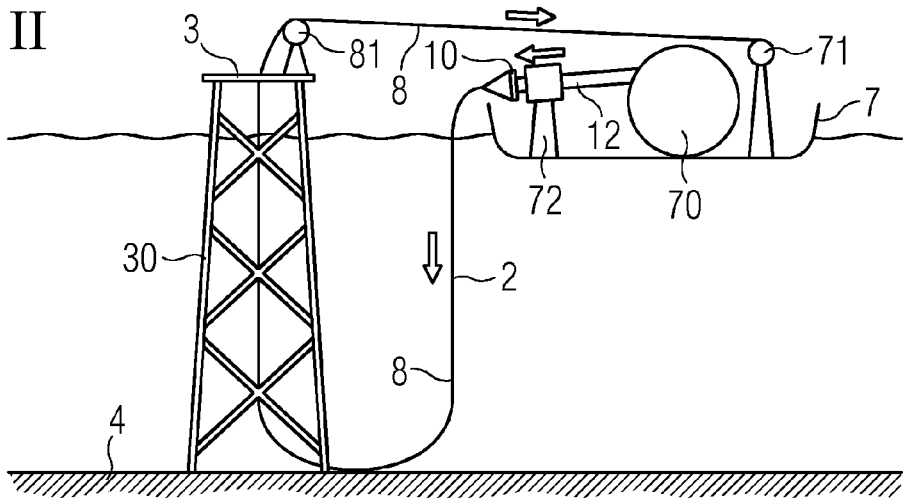
Figure 6:
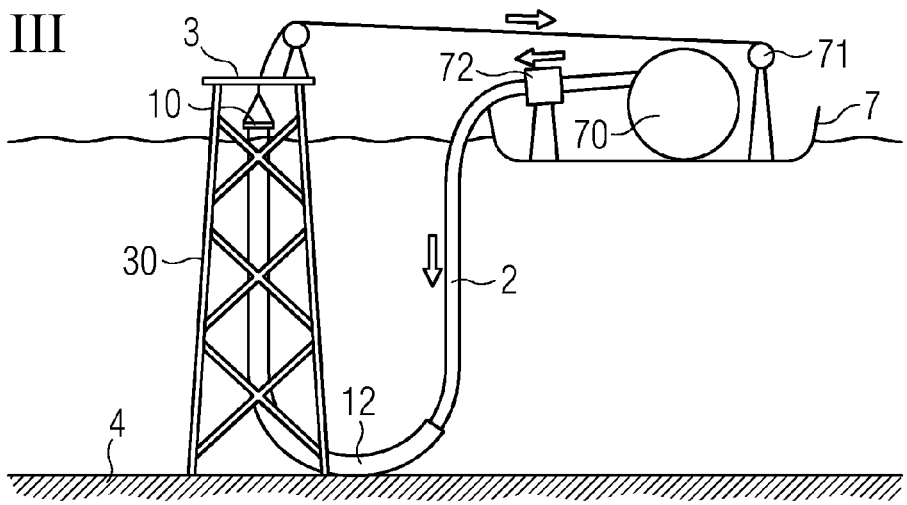

FIG. 6 shows several stages in an inventive mounting procedure. Stage I shows an initial stage, in which a catch wire 8 or messenger wire 8 has been left in place so that both ends of the catch wire 8 are connected to a buoy 80 that floats on the water near an offshore installation. The catch wire 8 has been put in place on a roller 81 mounted to the transition piece.

In stage II, a vessel 7 approaches the offshore installation. The vessel 7 is loaded with a cable drum 70 with a transmission cable arrangement, pre-mounted in a rubber J-tube and connected to a lifting assembly 10. The catch wire 8 is retrieved. One end is connected to a pull arrangement 71, and the other end is connected to the lifting assembly 10. A push arrangement 72 is arranged in place about the rubber J-tube 12.

In stage III, the pull arrangement 71 and the push arrangement 72 are driven synchronously so that the catch wire 8 is pulled towards the vessel 7 (and rolled onto a drum) while the rubber J-tube 12 and transmission cable arrangement 2 are pushed out of the vessel 7, following the path of the catch wire 8, so that the rubber J-tube and transmission cable arrangement 2 are lifted up to the transition piece 3.

Figure 7:
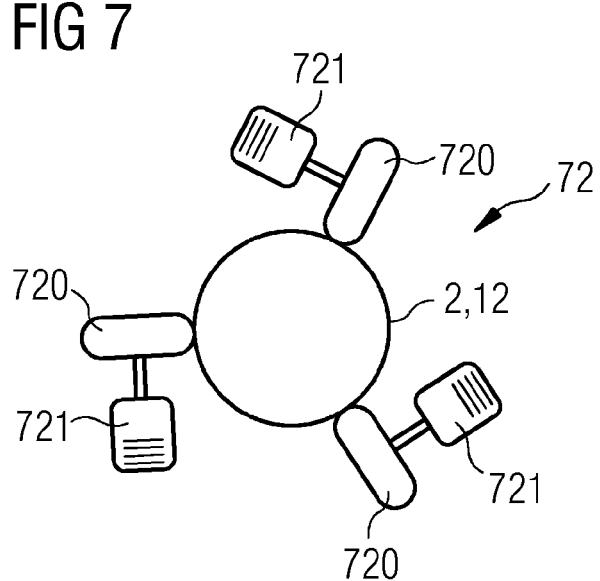
FIG. 7 shows a realisation of a push/pull arrangement for use in raising a lifting assembly according to the invention in a mounting procedure according to the invention.

FIG. 7 shows a realisation of part of a push/pull arrangement. In this embodiment, the push arrangement 72 comprises three friction wheels 720 that contact the rubber J-tube 12 or transmission cable assembly 2 with some pressure. Motors 721 actuate the friction wheels 720 so that these rotate in the same direction and at the same rate, thereby compelling the rubber J-tube 12 or transmission cable assembly 2 to move in the corresponding direction. The friction wheels 720 can have rubber tyres or some other suitable outer surface to ensure good traction between the wheels 720 and the tube or cable being coerced or pulled out of the drum 70. To ensure that a sufficient traction is maintained for the different diameters of the rubber J-tube and the transmission cable arrangement 2, the friction wheels 720 can be mounted in a spring-loaded manner in a frame (not shown) through which the cable 2 or tube 12 can pass. Although not shown here, several sets of wheels can be deployed, one after another, to deliver sufficient traction while at the same time ensuring that the cable is unharmed by undue pressure of the wheels, which may be the case if only one set of wheels is used.

Returning to FIG. 6, once the rubber J-tube 12 has been completely fed out of the cable drum 70 and the lifting assembly is mounted to the transition piece 3, the remainder of the transmission cable arrangement 2 can be drawn out of the drum 70 using the push arrangement 73 alone. The catch wire 8 is disconnected from the lifting assembly, and the vessel 7 can move away from the offshore facility, feeding out the rest of the transmission cable arrangement 2 en route to another offshore facility.

The end section of the transmission cable arrangement 2 can have been loaded into a second rubber J-tube, in which case the mounting procedure at the other offshore facility proceeds as described above.

Figure 8:
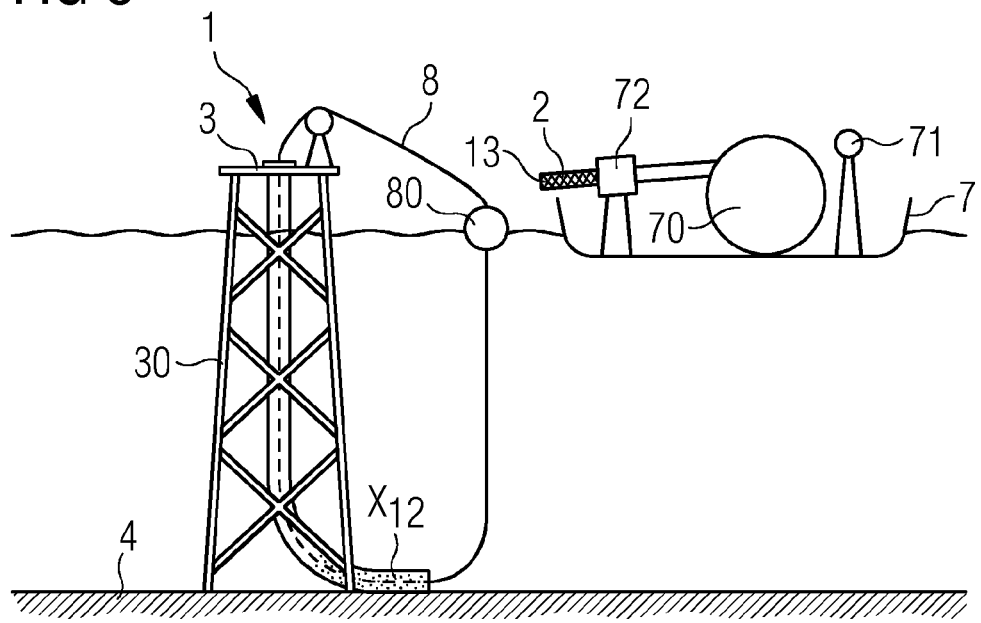
FIG. 8 shows a cable hang-off arrangement according to an embodiment of the invention in place at an offshore facility prior to a transmission cable loading step.

Alternatively, a rubber J-tube with lifting assembly can have been already mounted to the other offshore facility, with a catch wire passing through the rubber J-tube, with its ends connected to a buoy. This is illustrated in FIG. 8, which shows such a pre-installed rubber J-tube 12 in place at an offshore facility. A catch wire 8 is connected at both ends to a buoy 80. The length of the rubber J-tube 12 has been chosen so that the "surplus" lower portion $x_{12}$, indicated here by stippling, will assume a smooth curved shape as it rests on the seabed 4.

A mesh stocking 13 arranged about the end of the transmission cable arrangement 2 can be connected by means of a suitable connector, such as a swivel shackle, to the catch wire 8 after disconnecting this from the buoy 80. The other end of the catch wire is disconnected from the buoy also and is secured to the push-pull arrangement 72, 73, which is then used to feed the transmission cable arrangement 2 into the rubber J-tube 12, following the path of the catch wire 8, to load the transmission cable arrangement 2. Once the end of the transmission cable arrangement 2 appears at the transition level 3, strands of the mesh stocking 13 can be looped over the guide pins of the lifting assembly 10, so that the transmission cable arrangement 2 is secured to the transition piece 3.

Although the present invention has been disclosed in the form of preferred embodiments and variations thereon, it will be understood that numerous additional modifications and variations could be made thereto without departing from the scope of the invention. For example, the cable hang-off arrangement can be realised to be mounted to a side of the transition piece, for example about a semi-circular cut-out at the edge of a platform through which the transmission cable should pass. Of course, the cable hang-off arrangement could be realised or adapted to be mounted to any other appropriate part of a support structure or a wind turbine tower. Furthermore, it may become necessary at some point to secure the flexible J-tube to a supporting structure of the offshore facility. This may be considered necessary because of fatigue in the cable. To this end, bolts or cable clamps can be used to secure the J-tube to the supporting structure at strategic or critical locations, for example in a wave zone or tidal current zone.

For the sake of clarity, it is to be understood that the use of "a" or "an" throughout this application does not exclude a plurality, and "comprising" does not exclude other steps or elements.

I claim:

1. A cable hang-off arrangement for an elevated support, comprising:
   a cable assembly comprising a flexible reinforced protective tube for accommodating a transmission cable arrangement, wherein the flexible reinforced protective tube comprises a reinforcing layer;
   a mounting assembly configured to be arranged on a top surface of the elevated support; and
   a lifting assembly for lifting the cable assembly from a lower level to a higher level, wherein the lifting assembly comprises a clamp configured to clamp a portion of the reinforcing layer of the flexible reinforced protective tube to the lifting assembly, wherein the lifting assembly is configured to mount to the mounting assembly such that the cable assembly is suspended between the higher level and the lower level.

2. The cable hang-off arrangement according to claim 1, further comprising a suspension means for suspending the transmission cable arrangement from the lifting assembly.

3. The cable hang-off arrangement according to claim 2, wherein the lifting assembly comprises an attachment means for attaching the suspension means to the lifting assembly.

4. The cable hang-off arrangement according to claim 3, wherein the suspension means comprises at least one mesh stocking arranged to enclose a length of the transmission cable arrangement, and the attachment means is configured for connection to the mesh stocking, wherein the attachment means comprises at least one pin and/or hook.

5. The cable hang-off arrangement according to claim 1, further comprising a lifting connector for connection to a lifting apparatus.

6. The cable hang-off arrangement according to claim 1 wherein the mounting assembly comprises a plurality of guiding pins arranged to guide the lifting assembly onto the mounting assembly.

7. A cable hang-off arrangement for an elevated support, comprising:
   a cable assembly comprising a flexible reinforced protective tube for accommodating a transmission cable arrangement;
   a mounting assembly configured to be arranged on a top surface of the elevated support; and
   a lifting assembly for lifting the cable assembly from a lower level to a higher level, wherein the lifting assembly is configured to mount to the mounting assembly such that the cable assembly is suspended between the higher level and the lower level, wherein the mounting assembly comprises a plurality of guiding pins, each guide pin configured to be inserted into a through hole of the mounting assembly and a corresponding through hole of the lifting assembly.

8. The cable hang-off arrangement according to claim 7, further comprising at least one mesh stocking arranged to enclose a length of the transmission cable arrangement, and an attachment means is configured to attach the at least one mesh stocking to the lifting assembly, wherein the attachment means comprises at least one pin and/or hook.

9. The cable hang-off arrangement according to claim 7 further comprising the elevated support, wherein the higher level is at the elevated support.

10. A cable hang-off arrangement for an elevated support, comprising:
    a cable assembly comprising a flexible reinforced protective tube for accommodating a transmission cable arrangement;
    mounting assembly configured to be arranged on a top surface of the elevated support; and
    a lifting assembly for lifting the cable assembly from a lower level to a higher level, wherein the lifting assembly is configured to mount to the mounting assembly such that the cable assembly is suspended between the higher level and the lower level, wherein the lifting assembly and the mounting assembly comprise complementary essentially semi-circular forms, and wherein the semi-circular forms each comprise an outer arc and an inner arc and wherein the inner arcs are configured to accommodate the transmission cable arrangement in a horizontal position.

11. The cable hang-off arrangement according to claim 10, wherein the flexible reinforced protective tube comprises a reinforcing layer, and wherein the lifting assembly comprises a clamping means for clamping a portion of the reinforcing layer of the flexible reinforced protective tube to the lifting assembly.

12. The cable hang-off arrangement according to claim 10, further comprising at least one mesh stocking arranged to enclose a length of the transmission cable arrangement, and an attachment means configured to attach the at least one mesh stocking to the lifting assembly, wherein the attachment means comprises at least one pin and/or hook.

13. An offshore facility, comprising:
    a cable hang-off arrangement for the elevated support, comprising:
    a cable assembly comprising a flexible reinforced protective tube for accommodating a transmission cable arrangement, wherein the flexible reinforced protective tube comprises a reinforcing layer;
    a mounting assembly configured to be arranged on a top surface of the elevated support; and
    a lifting assembly for lifting the cable assembly from a lower level to a higher level, wherein the lifting assembly comprises a clamp configured to clamp a portion of the reinforcing layer of the flexible reinforced protective tube to the lifting assembly, wherein the lifting assembly is configured to mount to the mounting assembly such that the cable assembly is suspended between the higher level and the lower level;
    the elevated support above the lower level; and
    the transmission cable arrangement,
    wherein the flexible reinforced protective tube guides the transmission cable arrangement through an essentially vertical direction from the elevated support to the lower level into an essentially horizontal direction at the lower level;

wherein the cable assembly is suspended from the elevated support by the lifting assembly.

14. The offshore facility according to claim 13, wherein the flexible reinforced protective tube is configured to obtain a minimum bending radius of the transmission cable arrangement.

15. The offshore facility according to claim 13, wherein the length of the flexible reinforced protective tube exceeds the height of the elevated support above the lower level such that a lower portion of the flexible reinforced protective tube assumes a curved shape when the lower portion rests on the lower level.

16. The offshore facility according to claim 13, wherein the lifting assembly and the mounting assembly comprise complementary essentially semi-circular forms, and wherein the semi-circular forms each comprise an outer arc and an inner arc and wherein the transmission cable arrangement is arranged horizontally within the inner arcs.

17. A method of mounting a cable hang-off arrangement to an elevated support, the cable hang off arrangement comprising:
   a cable assembly comprising a flexible reinforced protective tube for accommodating a transmission cable arrangement, wherein the flexible reinforced protective tube comprises a reinforcing layer;
   a mounting assembly configured to be arranged on a top surface of the elevated support; and
   a lifting assembly for lifting the cable assembly from a lower level to a higher level, wherein the lifting assembly comprises a clamp configured to clamp a portion of the reinforcing layer of the flexible reinforced protective tube to the lifting assembly,
   wherein the lifting assembly is configured to mount to the mounting assembly such that the cable assembly is suspended between the higher level and the lower level, the method comprising:
   arranging the mounting assembly of the cable hang-off arrangement on the elevated support;
   attaching the cable assembly to the lifting assembly by clamping the portion of the reinforcing layer of the flexible reinforced protective tube to the lifting assembly;
   raising the lifting assembly to the elevated support; and
   securing the lifting assembly to the mounting assembly such that the cable assembly is suspended between the elevated support and the lower level.

18. The method according to claim 17, further comprising arranging a-the transmission cable arrangement in a-the flexible reinforced protective tube, prior to the attaching the cable assembly to the lifting assembly.

19. The method according to claim 18, further comprising determining the height of the elevated support and choosing the length of the flexible reinforced protective tube accordingly such that, in a suspended state of the cable assembly, an end portion of the flexible reinforced protective tube assumes a curved shape when the end portion rests on the lower level.

20. The method according to claim 17, further comprising connecting a temporary messenger wire to the lifting assembly and arranging the lifting assembly and the cable assembly on the lower level, prior to the raising the lifting assembly to the elevated support.

* * * * *